United States Patent
Su et al.

(10) Patent No.: US 11,315,555 B2
(45) Date of Patent: Apr. 26, 2022

(54) TERMINAL HOLDER AND FAR-FIELD VOICE INTERACTION SYSTEM

(71) Applicant: Baidu Online Network Technology (Beijing) Co., Ltd., Beijing (CN)

(72) Inventors: Hong Su, Beijing (CN); Peng Li, Beijing (CN); Lifeng Zhao, Beijing (CN)

(73) Assignees: Baidu Online Network Technology (Beijing) Co., Ltd., Beijing (CN); Shanghai Xiaodu Technology Co., Ltd., Shanghai (CN)

( * ) Notice: Subject to any disclaimer, the term of this patent is extended or adjusted under 35 U.S.C. 154(b) by 127 days.

(21) Appl. No.: 16/204,823

(22) Filed: Nov. 29, 2018

(65) Prior Publication Data

US 2019/0287521 A1    Sep. 19, 2019

(30) Foreign Application Priority Data

Mar. 14, 2018  (CN) .......................... 201810210026.7

(51) Int. Cl.
  *G10L 15/22*   (2006.01)
  *G10L 15/08*   (2006.01)
  *G10L 15/30*   (2013.01)

(52) U.S. Cl.
  CPC .............. *G10L 15/22* (2013.01); *G10L 15/08* (2013.01); *G10L 15/30* (2013.01); *G10L 2015/088* (2013.01); *G10L 2015/223* (2013.01)

(58) Field of Classification Search
  CPC ........ G10L 21/00; G10L 15/22; G06F 3/0482
  See application file for complete search history.

(56) References Cited

U.S. PATENT DOCUMENTS 7,113,610 B1 * 9/2006 Chrysanthakopoulos ................... H04R 5/02 381/309
8,468,023 B1 * 6/2013 Stracke, Jr. ............. G06F 3/167 704/275

(Continued)

FOREIGN PATENT DOCUMENTS

CN  102855872 A  1/2013
CN  106611600 A  5/2017

(Continued)

OTHER PUBLICATIONS

"How to develop an Echo smart audio with over 10 million sales?"; retrieved from www.sohu.com/a/127652128_128469; with English translation; Mar. 2, 2017; (15 pages).

(Continued)

*Primary Examiner* — Anne L Thomas-Homescu
(74) *Attorney, Agent, or Firm* — Nixon Peabody LLP

(57) ABSTRACT

Embodiments of the present disclosure disclose a terminal holder and a far-field voice interaction system. A specific implementation of the terminal holder includes: a far-field voice pickup device and a voice analysis device. The far-field voice pickup device receives voice sent by a user, and sends the voice to the voice analysis device. The voice analysis device analyzes the voice, determines whether the voice contains a preset wake-up word, and sends the voice to a terminal in communication connection with the terminal holder when the preset wake-up word is contained. This embodiment receives voice sent by a user through the terminal holder supporting a far-field voice pickup function, thereby facilitating the far-field voice control over the terminal.

10 Claims, 3 Drawing Sheets

(56) References Cited

U.S. PATENT DOCUMENTS

| | | | |
|---|---|---|---|
| 10,096,319 B1* | 10/2018 | Jin | G10L 25/63 |
| 10,367,540 B1* | 7/2019 | Medapalli | H04B 1/406 |
| 10,466,962 B2* | 11/2019 | Wilberding | H04N 21/4394 |
| 10,482,904 B1* | 11/2019 | Hardie | G10L 15/22 |
| 10,528,977 B1* | 1/2020 | Jogia | G06Q 30/0641 |
| 10,531,157 B1* | 1/2020 | Loritsch | G06F 3/165 |
| 10,586,534 B1* | 3/2020 | Argyropoulos | G10L 15/20 |
| 10,621,981 B2* | 4/2020 | Sereshki | G10L 21/0232 |
| 2008/0172789 A1* | 7/2008 | Elliot | A61G 7/0507 5/616 |
| 2011/0257973 A1* | 10/2011 | Chutorash | B60R 16/0373 704/235 |
| 2013/0028443 A1* | 1/2013 | Pance | G06F 3/167 381/107 |
| 2013/0223658 A1* | 8/2013 | Betlehem | H04S 3/002 381/307 |
| 2014/0003611 A1* | 1/2014 | Mohammad | H04B 3/20 381/66 |
| 2014/0229184 A1* | 8/2014 | Shires | G10L 15/32 704/275 |
| 2016/0240196 A1* | 8/2016 | Yamashita | G10L 15/30 |
| 2017/0027919 A1 | 2/2017 | Wustman | |
| 2017/0040018 A1* | 2/2017 | Tormey | H04L 12/4633 |
| 2018/0109895 A1* | 4/2018 | Audfray | H04R 27/00 |
| 2018/0277113 A1* | 9/2018 | Hartung | G10L 15/30 |
| 2018/0335903 A1* | 11/2018 | Coffman | G06F 3/165 |
| 2018/0366117 A1* | 12/2018 | Carreras | G10L 21/0216 |
| 2019/0043514 A1* | 2/2019 | Maziewski | G10L 15/34 |
| 2019/0080685 A1* | 3/2019 | Johnson, Jr. | G10L 15/22 |
| 2019/0088262 A1* | 3/2019 | Wang | G06F 16/61 |
| 2019/0180740 A1* | 6/2019 | Nandy | G10L 15/22 |
| 2019/0237089 A1* | 8/2019 | Shin | H04N 21/4221 |
| 2019/0285745 A1* | 9/2019 | Bultan | G01S 15/06 |
| 2020/0013396 A1* | 1/2020 | Park | G10L 15/22 |
| 2020/0020331 A1* | 1/2020 | Kim | G10L 15/30 |
| 2020/0114834 A1* | 4/2020 | Endo | B60R 11/0217 |
| 2020/0118548 A1* | 4/2020 | Huang | G10L 15/22 |
| 2020/0118559 A1* | 4/2020 | Huang | G10L 15/30 |
| 2020/0133382 A1* | 4/2020 | Magi | G06F 1/1686 |
| 2020/0143185 A1* | 5/2020 | Zhang | G06K 9/00832 |
| 2020/0143649 A1* | 5/2020 | Coonley | G08B 13/1672 |
| 2020/0143810 A1* | 5/2020 | Okuma | G06F 3/013 |
| 2020/0150759 A1* | 5/2020 | Zhang | B60W 40/08 |
| 2020/0151477 A1* | 5/2020 | Onaka | B60R 16/0232 |
| 2020/0152193 A1* | 5/2020 | Onaka | G06F 3/013 |
| 2021/0163032 A1* | 6/2021 | Ohkubo | G10L 15/22 |

FOREIGN PATENT DOCUMENTS

| | | |
|---|---|---|
| JP | 2013214924 A | 10/2013 |
| JP | 2016178662 A | 10/2016 |

OTHER PUBLICATIONS

"Bluetooth Speaker, 20W, 400-SP037"; Dec. 1, 2019; English translation not available (12 pages).

* cited by examiner

TERMINAL HOLDER AND FAR-FIELD VOICE INTERACTION SYSTEM

CROSS-REFERENCE TO RELATED APPLICATIONS

This application claims priority to Chinese Patent Application No. 201810210026.7, filed in China on Mar. 14, 2018, titled "Terminal Holder and Far-Field Voice Interaction System," which is hereby incorporated by reference in its entirety.

TECHNICAL FIELD

Embodiments of the present disclosure relate to the field of computer technology, and more specifically to a terminal holder and a far-field voice interaction system.

BACKGROUND

As smart terminals (such as smart phones) become more and more popular, people use smart terminals for longer time, and there is the need to use the smart terminals at anytime or anywhere. Due to size constraints, the smart terminals usually have built-in near-field voice pickup devices (such as microphones) and near-field playback devices (such as cell phone speakers) to support a near-field voice interaction function. That is, when a user is close to a smart terminal, a feedback is available by speaking. This kind of interaction is the most natural and easiest interaction for humans, effectively freeing hands and minimizing operational difficulty. However, in the case that the user is far away from the smart terminal, since the smart terminal does not support a far-field voice interaction function, the user usually cannot perform voice control of the smart terminal.

SUMMARY

Embodiments of the present disclosure provide a terminal holder and a far-field voice interaction system.

In a first aspect, the embodiments of the present disclosure provide a terminal holder, including a far-field voice pickup device and a voice analysis device. The far-field voice pickup device receives voice sent by a user, and sends the voice to the voice analysis device. The voice analysis device analyzes the voice, determines whether the voice contains a preset wake-up word, and sends the voice to a terminal in communication connection with the terminal holder when the preset wake-up word is contained.

In some embodiments, the terminal holder further includes a far-field playback device, and the far-field playback device plays voice play information received from the terminal.

In some embodiments, the far-field playback device includes a power amplifier for amplifying power of the voice play information.

In some embodiments, the terminal holder further includes a Bluetooth module, the Bluetooth module of the terminal holder sends a communication link establishment instruction to a Bluetooth module of the terminal when the voice contains the preset wake-up word, to trigger an establishment of a Bluetooth synchronous connection oriented link between the Bluetooth module of the terminal and the Bluetooth module of the terminal holder.

In some embodiments, the terminal holder sends the voice to the terminal through the Bluetooth synchronous connection oriented link, and the terminal holder receives the voice play information from the terminal through the Bluetooth synchronous connection oriented link.

In a second aspect, the embodiments of the present disclosure provide a far-field voice interaction system, including a terminal and the terminal holder according to any embodiment in the first aspect, and the terminal being communicatively connected to the terminal holder.

In some embodiments, the terminal includes a control device and an executive device; the control device performs analysis processing on the voice, determines control information corresponding to the voice, and sends the control information to the executive device; and the executive device performs an operation corresponding to the control information.

In some embodiments, the far-field voice interaction system includes a cloud server; and the cloud server receives voice sent by the terminal, performs analysis processing on the voice, determines control information corresponding to the voice, and sends a control instruction including the control information to the terminal, to cause the executive device of the terminal to perform an operation corresponding to the control information.

In some embodiments, when the control information includes voice play information, the terminal sends the voice play information to the terminal holder, and the far-field playback device of the terminal holder plays the voice play information.

In some embodiments, the terminal includes a near-field voice pickup device and a near-field playback device, and after a communication link is established between the terminal and the terminal holder, the terminal switches an operating state of the near-field voice pickup device and the near-field playback device to an off state.

The embodiments of the present disclosure provide a terminal holder and a far-field voice interaction system. The terminal holder receives voice sent by a user through a far-field voice pickup device, to send the voice to a voice analysis device. Then, the voice analysis device analyzes the voice to determine whether the voice contains a preset wake-up word, and sends the voice to the terminal in communication connection with the terminal holder when the preset wake-up word is contained. That is, receiving the voice sent by the user through the terminal holder supporting a far-field voice pickup function facilitates the far-field voice control over the terminal.

BRIEF DESCRIPTION OF THE DRAWINGS

After reading detailed descriptions of non-limiting embodiments with reference to the following accompanying drawings, other characteristics, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
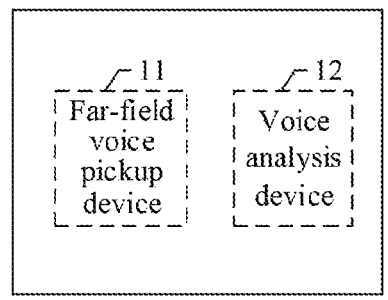
FIG. 1 is a schematic structural diagram of an embodiment of a terminal holder provided by the present disclosure.

Referring to FIG. 1, which shows a schematic structural diagram of an embodiment of a terminal holder provided by the present disclosure. The terminal holder in the present embodiment may include a far-field voice pickup device 11 and a voice analysis device 12.

In the present embodiment, the far-field voice pickup device 11 may first receive voice sent by a user, and then send the voice to the voice analysis device 12. The voice analysis device 12 may analyze the voice to determine whether the voice contains a preset wake-up word. When the voice contains the preset wake-up word, the voice is sent to a terminal in communication connection with the terminal holder.

Being subject to the constraints of terminals size, existing terminals (such as smart phones) are usually only equipped with near-field voice pickup devices (such as microphones), and support the near-field (for example, within 1 meter) voice pickup function. However, when the user is far away from a terminal (for example, within 5 meters), the near-field voice pickup device of the terminal is usually unable to receive voice sent by the user. Here, the voice sent by the user may be received by the far-field voice pickup device 11 in the terminal holder, to cause the terminal to acquire the voice from the terminal holder that is communicatively connected thereto, so as to implement far-field voice control over the terminal.

In the present embodiment, the far-field voice pickup device 11 may be various devices that can receive the voice sent by remote users, such as a microphone array. The microphone array may be composed of a certain number of acoustic sensors (generally microphones) of a certain spatial configuration, for sampling and processing the spatial characteristic of the sound field. In practice, linear, circular, and spherical microphone arrays are not much different in principle, but due to the different spatial configurations, the spatial range recognizable to the microphone arrays of different shapes are different. For example, in sound source localization, linear arrays have only one-dimensional information and can only recognize voices from 180 degrees. Circular arrays are planar arrays having two-dimensional information and can recognize voices from 360 degrees. Spherical arrays are three-dimensional spatial arrays having three-dimensional information and can recognize voices from azimuth angles of 360 degrees and pitch angles of 180 degrees. Here, in order to facilitate the far-field voice control over the terminal by users at different locations, a circular microphone array or a spherical microphone array is generally used as the far-field voice pickup device 11. Secondly, the more the number of microphones in the microphone array, the finer the space that the beam can distinguish, and the higher the quality of the voice received in a noisy environment. However, the more the number of microphones in the microphone array, the higher the cost. Therefore, the proper number of microphones may be determined in conjunction with the distance of the far-field voice interaction.

In addition, in order to improve the accuracy of subsequent recognition of the voice, the far-field voice pickup device 11 may also process the voice by using certain processing algorithms (such as a denoising algorithm, and an acoustic algorithm for eliminating echo or removing reverberation). For example, based on a beamforming based approach, the far-field voice pickup device 11 may form a pickup beam in the target direction and attenuate reflected sound from other directions by weighting and adding the voice received by the plurality of microphones in the microphone array, thereby obtaining clean voice.

In the present embodiment, the voice analysis device 12 may analyze the voice received by the far-field voice pickup device 11 by using a commonly used voice analysis method (for example, a voice recognition method or a semantic understanding method). For example, the voice analysis device 12 may first perform voice recognition on the voice by using Automatic Speech Recognition (ASR), and convert the vocabulary content in the voice into a vocabulary content in a written language form; and then utilize word segmentation technology (e.g., full segmentation method) to segment the vocabulary content in written language form into words; and finally determine whether there is a preset wake-up word (such as "AA" and "hello") in the segmented words. When it is determined that the preset wake-up word is contained in the voice, the voice is sent to the terminal in communication connection with the terminal holder, so as to implement far-field voice control over the terminal. When it is determined that the preset wake-up word is not contained in the voice, the flow ends. That is to say, if the user desires to perform far-field voice control over the terminal, it is necessary to simultaneously announce the preset wake-up word and the information for controlling the terminal.

In the present embodiment, the terminal and the terminal holder may establish a communication connection through various methods.

For example, the terminal holder may be provided with a wired port device. The wired port device may be connected to a network cable for implementing a wired network connection. Here, the wired port device may include a wired interface, such as a socket in the RJ45 (Registered Jack 45, connector). In this way, when the connector of the network cable is inserted into the socket, a wired network connection may be realized. It may be understood that this wired connection may be plug and play without trivial network configuration process. Usually there will be no network disconnection, and the network operation is stable.

As another example, the terminal holder may be configured with a Wi-Fi (Wireless-Fidelity) chip. The Wi-Fi chip may trigger the terminal holder to connect to the wireless local area network. In this way, as long as within the wireless local area network signal coverage, that is, the Wi-Fi chip can receive the wireless signal, the location of the terminal holder may be arbitrarily arranged without being bound by the network cable, thereby improving the convenience of the user.

As yet another example, the terminal holder may be configured with a Bluetooth module. The Bluetooth module may trigger a short-range wireless communication connection between the terminal and the terminal holder. That is to say, Bluetooth may transmit information between the terminal holder and the terminal. In this way, the interaction between the terminal holder and the terminal may be enriched without relying on the connection of the terminal holder to the network.

It should be noted that the terminal is usually fixedly placed on the terminal holder. The shape of the terminal holder may not be limited, as long as the terminal can be fixedly placed in an appropriate position.

The terminal holder proposed by the embodiments of the present disclosure receives voice sent by a user through a far-field voice pickup device, to send the voice to a voice analysis device. Then, the voice analysis device analyzes the voice to determine whether the voice contains a preset wake-up word, and sends the voice to the terminal in communication connection with the terminal holder when the preset wake-up word is contained. That is to say, receiving the voice sent by the user through the terminal holder supporting a far-field voice pickup function facilitates the far-field voice control over the terminal.

Figure 2:
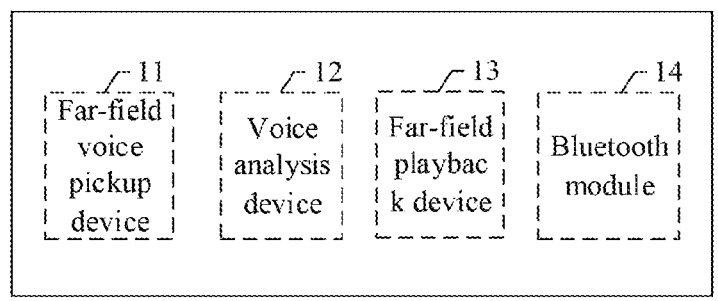
FIG. 2 is a schematic structural diagram of another embodiment of the terminal holder provided by the present disclosure.

With further reference to FIG. 2, a schematic structural diagram of another embodiment of the terminal holder provided by the present disclosure is illustrated. The terminal holder in the present embodiment may include the far-field voice pickup device 11, the voice analysis device 12, a far-field playback device 13, and a Bluetooth module 14.

In the present embodiment, the far-field voice pickup device 11 may first receive the voice sent by the user, and then send the voice to the voice analysis device 12. The voice analysis device 12 may analyze the voice to determine whether the voice contains a preset wake-up word. When it is determined that the voice contains the preset wake-up word, the Bluetooth module 14 of the terminal holder sends a communication link establishment instruction to the Bluetooth module of the terminal to trigger a Bluetooth SCO (Synchronous Connection Oriented) link between the Bluetooth module of the terminal and the Bluetooth module 14 of the terminal holder. The terminal holder may send the voice to the terminal through the Bluetooth SCO link. At the same time, the terminal holder may further include the far-field playback device 13, and the far-field playback device 13 may receive voice play information from the terminal through the Bluetooth SCO link, and play the voice play information received from the terminal.

Existing terminals (such as smart phones) are usually only equipped with near-field voice pickup devices (such as mobile phone speakers) due to the constraints of terminals size, and support the near-field (for example, within 1 meter) playback function. However, when the user is far away from a terminal (for example, within 5 meters), the voice play information played by the near-field playback device of the terminal is usually not well received by the user. Here, the voice play information may be played through the far-field playback device 13 in the terminal holder, so that the voice play information may be well received by the user.

In the present embodiment, the far-field playback device 13 may be composed of a plurality of speakers of different orientations so that users at different locations can receive the voice play information. Usually, the far-field playback device 13 is provided with a power amplifier for amplifying the power of the voice play information. In this way, the volume of the voice play information played by the far-field playback device 13 may be increased, so that the user far from the terminal may also receive the voice play information well.

In the present embodiment, the terminal holder generally supports NFC (Near Field Communication) function, Bluetooth function or BLE (Bluetooth Low Energy) function.

For example, when an NFC-enabled terminal is placed on an NFC-enabled terminal holder, the terminal may establish a Bluetooth and BLE connection with the terminal holder through a pre-installed specific application. When the user says the preset wake-up word to the terminal holder, the Bluetooth module 14 of the terminal holder may send a communication link establishment instruction to the Bluetooth module of the terminal to trigger the establishment of a Bluetooth SCO link between the Bluetooth module of the terminal and the Bluetooth module 14 of the terminal holder. Here, Bluetooth is a radio technology that supports short-range communication between devices. Bluetooth technology specifies that when Bluetooth communication is performed between a pair of devices, one device must be set as the master device and the other device as the slave device to implement communication between the pair of devices. Usually, the master device performs a searching, initiates a pairing, and establishes a Bluetooth physical link between the master device and the slave device, so that the master device and the slave device transmit and receive information through the Bluetooth physical link. Typically, Bluetooth physical links may include two types: SCO links and ACL (Asynchronous Connection Less) links. The SCO link is mainly used for synchronous voice transmission, and the ACL link is mainly used for packet data transmission.

As can be seen from FIG. 2, the terminal holder in the present embodiment adds the far-field playback device 13 and the Bluetooth module 14 as compared with the embodiment corresponding to FIG. 1. Therefore, the terminal holder described in the present embodiment not only supports the far-field voice pickup function, but also supports the far-field playback function, so that the terminal holder supports the far-field voice interaction function. The terminal holder and the terminal may establish a communication connection through Bluetooth, enriching the interaction between the terminal holder and the terminal.

The embodiments of the present disclosure further provide a far-field voice interaction system, which may include a terminal and a terminal holder described in the above embodiments. The terminal may be in communication connection with the terminal holder. As an example, the far-field voice interaction system may be as shown in FIG. 3, which shows a schematic structural diagram of an embodiment of the far-field voice interaction system provided by the present disclosure.

Figure 3:
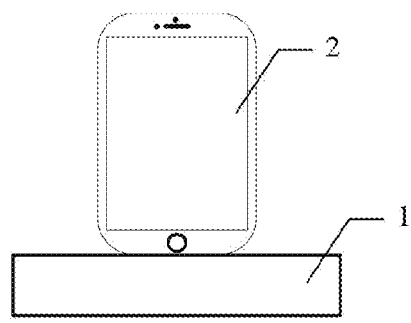
FIG. 3 is a schematic structural diagram of an embodiment of a far-field voice interaction system provided by the present disclosure.

As shown in FIG. 3, the far-field voice interaction system may include a terminal 2 and a terminal holder 1. The terminal 2 and the terminal holder 1 are communicatively connected.

In the present embodiment, the terminal 2 and the terminal holder 1 may establish a communication connection through various approaches, including but not limited to a wired network connection, a wireless network connection, a Bluetooth connection, and the like.

In the present embodiment, after receiving the voice sent by the terminal holder 1, the terminal 2 may acquire control information corresponding to the voice in a plurality of methods.

As an example, the terminal 2 may include a control device and an executive device. Here, the control device may first perform analysis processing on the voice, thus determine control information corresponding to the voice, and then send the control information to the executive device. The executive device may perform an operation corresponding to the control information. For example, the terminal 2 may locally pre-store a sample voice set and sample control information corresponding to each piece of the sample voice. Specifically, the control device may match the voice with each piece of the sample voice in the sample voice set one by one, if there is a piece of sample voice in the sample voice set identical or similar to the voice, the piece of sample voice matches the voice. Then, the control device may locally find sample control information corresponding to the piece of sample voice as the control information corresponding to the piece of voice, and send it to the executive device to cause the executive device to perform an operation corresponding to the control information. Here, the executive device may be more than one. For example, if the voice is "AA, play the movie titled XX", the control information may be video of the movie XX, and the executive device may be the display screen and speaker of the terminal 2. Here, the display screen may display frames in the video of the movie XX, and the speaker may play audio in the video of the movie XX.

As another example, the far-field voice interaction system may further include a cloud server, and the cloud server is in communication connection with the terminal 2. Here, the cloud server may receive the voice sent by the terminal 2, and perform analysis processing on the voice to determine control information corresponding to the voice, and send a control instruction including the control information to the terminal, to cause the executive device of the terminal to perform an operation corresponding to the control information. For example, the cloud server may pre-store the sample voice set and sample control information corresponding to each piece of the sample voice. Specifically, the cloud server may first acquire voice from the terminal 2 that is communicatively connected thereto; and then match the voice with each piece of the sample voice in the sample voice set one by one, if there is a piece of sample voice in the sample voice set identical or similar to the voice, the piece of sample voice matches the voice. Then, the cloud server may find the sample control information corresponding to the piece of sample voice as the control information corresponding to the voice, and send it to the terminal 2 that is communicatively connected thereto, to cause the terminal 2 to perform an operation corresponding to the control information.

In some alternative implementations of the present embodiment, when the control information includes voice play information, the terminal 2 may send the voice play information to the terminal holder 1, and the far-field playback device 13 of the terminal holder 1 may play the voice play information. Thus, the far-field playback device 13 is used to play the voice play information, so that the voice play information may be well received by remote users. For example, if the control information is the video of the movie XX, the terminal 2 may send audio in the video of the movie XX to the terminal holder 1. While the display screen of the terminal 2 displays the frames in the video of the movie XX, the terminal holder 1 plays the audio in the video of the movie XX.

In some alternative implementations of the present embodiment, the terminal 2 may include a near-field voice pickup device and a near-field playback device, and after a communication link is established between the terminal 2 and the terminal holder 1, the terminal 2 may switch an operating state of the near-field voice pickup device and the near-field playback device to an off state.

Figure 4:
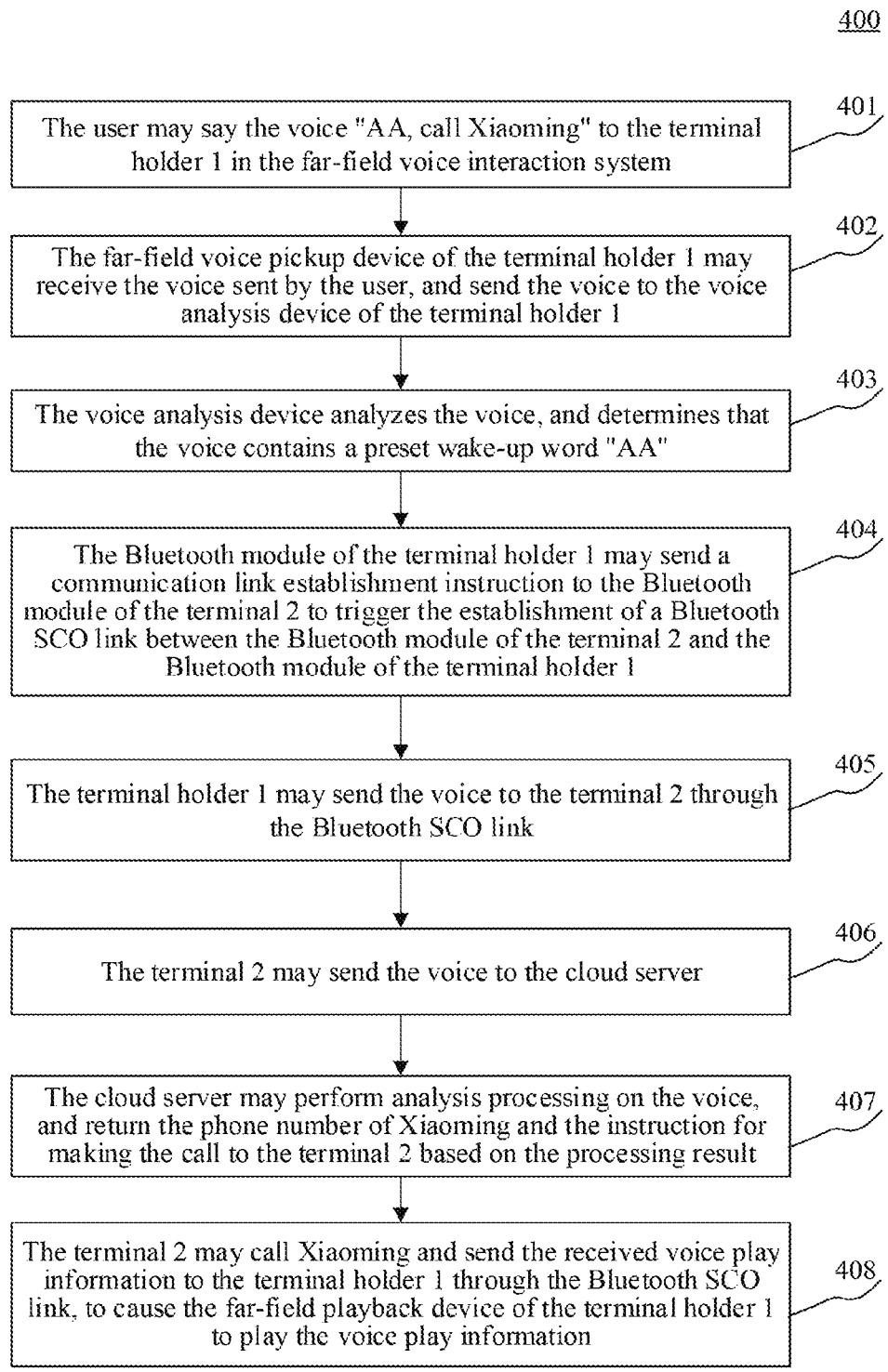
FIG. 4 is a flowchart of internal interaction of an application scenario of the far-field voice interaction system provided by the present disclosure.

An embodiment of the present disclosure further provides an application scenario of the far-field voice interaction system. FIG. 4 illustrates a flow 400 of internal interaction of an application scenario of the far-field voice interaction system provided by the present disclosure. First, as shown in 401, the user may say the voice "AA, call Xiaoming" to the terminal holder 1 in the far-field voice interaction system. Then, as shown in 402, the far-field voice pickup device of the terminal holder 1 may receive the voice sent by the user, and send the voice to the voice analysis device of the terminal holder 1. Then, as shown in 403, the voice analysis device analyzes the voice, and determines that the voice contains a preset wake-up word "AA". Then, as shown in 404, the Bluetooth module of the terminal holder 1 may send a communication link establishment instruction to the Bluetooth module of the terminal 2 to trigger the establishment of a Bluetooth SCO link between the Bluetooth module of the terminal 2 and the Bluetooth module of the terminal holder 1. As shown in 405, the terminal holder 1 may send the voice to the terminal 2 through the Bluetooth SCO link. Then, as shown in 406, the terminal 2 may send the voice to the cloud server. Then, as shown in 407, the cloud server may perform analysis processing on the voice, and return the phone number of Xiaoming and the instruction for making the call to the terminal 2 based on the processing result. Finally, as shown in 408, the terminal 2 may call Xiaoming and send the received voice play information to the terminal holder 1 through the Bluetooth SCO link, so that the far-field playback device of the terminal holder 1 plays the voice play information.

Figure 5:
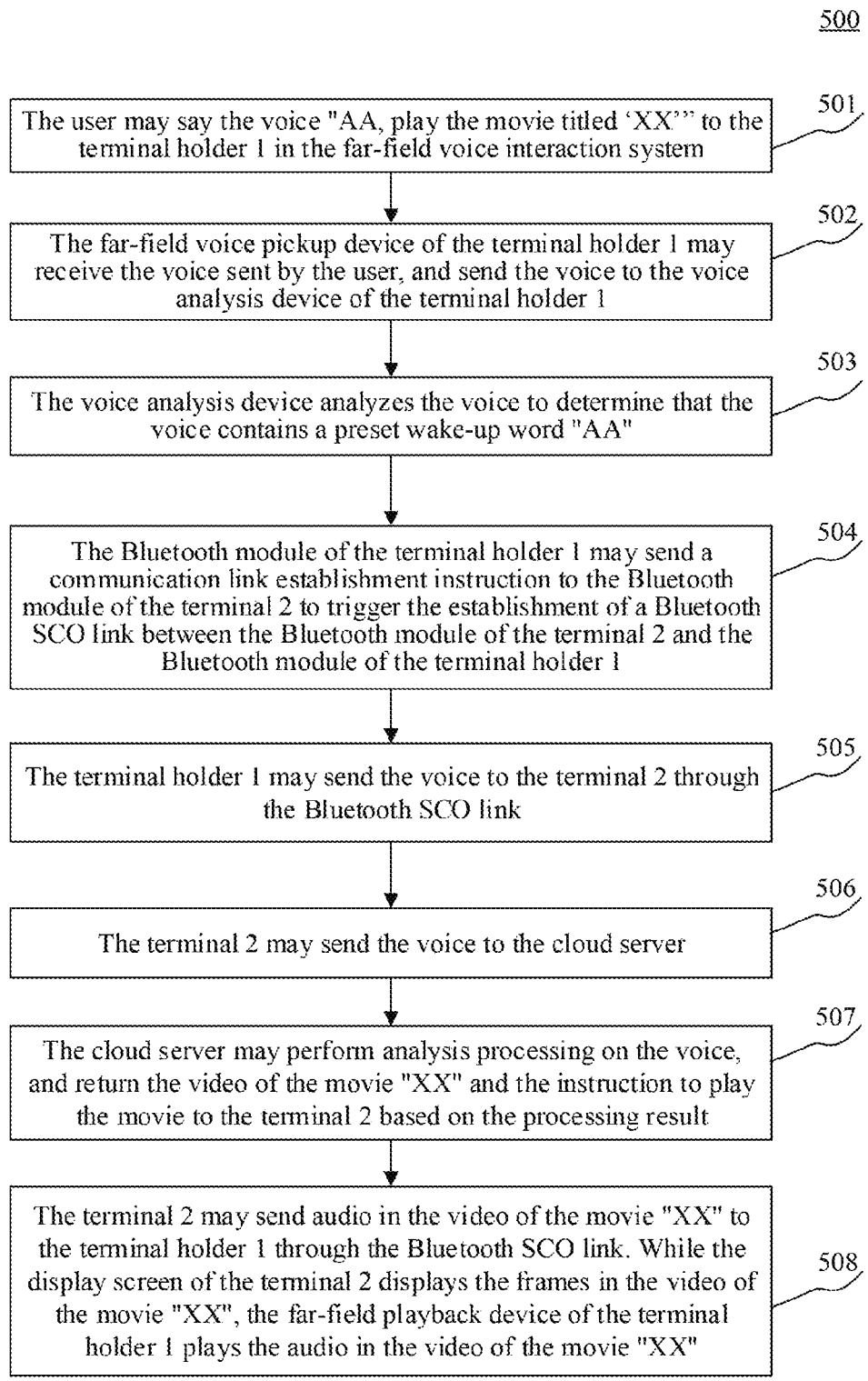
FIG. 5 is a flowchart of internal interaction of another application scenario of the far-field voice interaction system provided by the present disclosure.

An embodiment of the present disclosure further provides another application scenario of the far-field voice interaction system. FIG. 5 illustrates a flow 500 of internal interaction of another application scenario of the far-field voice interaction system provided by the present disclosure. First, as shown in 501, the user may say the voice "AA, play the movie titled XX" to the terminal holder 1 in the far-field voice interaction system. Then, as shown in 502, the far-field voice pickup device of the terminal holder 1 may receive the voice sent by the user, and send the voice to the voice analysis device of the terminal holder 1. Then, as shown in 503, the voice analysis device analyzes the voice to determine that the voice contains a preset wake-up word "AA". Then, as shown in 504, the Bluetooth module of the terminal holder 1 may send a communication link establishment instruction to the Bluetooth module of the terminal 2 to trigger the establishment of a Bluetooth SCO link between the Bluetooth module of the terminal 2 and the Bluetooth module of the terminal holder 1. Then, as shown in 505, the terminal holder 1 may send the voice to the terminal 2 through the Bluetooth SCO link. Then, as shown in 506, the terminal 2 may send the voice to the cloud server. Then, as shown in 507, the cloud server may perform analysis processing on the voice, and return the video of the movie XX and the instruction to play the movie to the terminal 2 based on the processing result. Finally, as shown in 508, the terminal 2 may send audio in the video of the movie XX to the terminal holder 1 through the Bluetooth SCO link. While the display screen of the terminal 2 displays the frames in the video of the movie XX, the far-field playback device of the terminal holder 1 plays the audio in the video of the movie XX.

The far-field voice interaction system provided by the embodiments of the present disclosure receives voice sent by a user through a far-field voice pickup device of a terminal holder, to send the voice to a terminal. Then, the terminal acquires control information corresponding to the voice to perform an operation corresponding to the control information. That is, the far-field voice interaction system implements far-field voice control over the terminal through a terminal holder that supports far-field voice interaction.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A terminal holder for holding a terminal placed thereon firmly, comprising a far-field voice pickup device a far-field playback device, a voice analysis device, and a Bluetooth module;

the far-field voice pickup device receiving voice sent by a user, and sending the voice to the voice analysis device;

the voice analysis device analyzing the v01ce, determining whether the v01ce containing a preset wake-up word, and sending the voice to the terminal held by the terminal holder and in communication connection with the terminal holder in response to the preset wake-up word being contained in the voice, for the terminal to perform analysis processing on the voice and determine control information, the control information comprising voice play information;

the Bluetooth module of the terminal holder triggers establishment of a Bluetooth synchronous connection oriented link between a Bluetooth module of the terminal and the Bluetooth module of the terminal holder in response to the voice containing the preset wake-up word, and the terminal holder sends the voice to the terminal through the Bluetooth synchronous connection oriented link; and the far-field playback device playing the voice play information received from the terminal in communication connection with the terminal holder, wherein the far-field playback device comprises a plurality of speakers of different orientations.

2. The terminal holder according to claim 1, wherein the far-field playback device comprises a power amplifier for amplifying power of the voice play information.

3. The terminal holder according to claim 1, wherein the Bluetooth module of the terminal holder sends the communication link establishment instruction to the Bluetooth module of the terminal when the voice contains the preset wake-up word, to trigger the establishment of the Bluetooth synchronous connection oriented link between the Bluetooth module of the terminal and the Bluetooth module of the terminal holder.

4. The terminal holder according to claim 1, wherein the terminal holder receives the voice play information from the terminal through the Bluetooth synchronous connection oriented link.

5. A far-field voice interaction system, comprising a terminal and a terminal holder for holding the terminal placed thereon firmly, and the terminal being communicatively connected to the terminal holder;

wherein the terminal holder comprises:
a far-field voice pickup device, a far-field playback device, a voice analysis device, and a Bluetooth module;

the far-field voice pickup device receiving voice sent by a user, and sending the voice to the voice analysis device;

the voice analysis device analyzing the voice, determining whether the voice containing a preset wake-up word, and sending the voice to the terminal held by the terminal holder in response to the preset wake-up word being contained in the voice, for the terminal to perform analysis processing on the voice and determine control information, the control information comprising voice play information;

the Bluetooth module of the terminal holder triggers establishment of a Bluetooth synchronous connection oriented link between a Bluetooth module of the terminal and the Bluetooth module of the terminal holder in response to the voice containing the preset wake-up word, and the terminal holder sends the voice to the terminal through the Bluetooth synchronous connection oriented link; and the far-field playback device playing the voice play information received from the terminal in communication connection with the terminal holder, wherein the far-field playback device comprises a plurality of speakers of different orientations.

6. The far-field voice interaction system according to claim 5, wherein the terminal comprises a control device and an executive device;

the control device performs analysis processing on the voice, determines control information corresponding to the voice, and sends the control information to the executive device; and the executive device performs an operation corresponding to the control information.

7. The far-field voice interaction system according to claim 5, wherein the far-field voice interaction system comprises a cloud server; and the cloud server receives voice sent by the terminal, performs analysis processing on the voice, determines control information corresponding to the voice, and sends a control instruction comprising the control information to the terminal, to cause the executive device of the terminal to perform an operation corresponding to the control information.

8. The far-field voice interaction system according to claim 6, wherein, when the control information comprises voice play information, the terminal sends the voice play information to the terminal holder, and a far-field playback device of the terminal holder plays the voice play information.

9. The far-field voice interaction system according to claim 5, wherein the terminal comprises a near-field voice pickup device and a near-field playback device, and after a communication link is established between the terminal and the terminal holder, the terminal switches an operating state of the near-field voice pickup device and the near-field playback device to an off state.

10. The terminal holder according to claim 1, wherein the far-field voice pickup device comprises a microphone array composed of a certain number of microphones.

* * * * *

UNITED STATES PATENT AND TRADEMARK OFFICE
CERTIFICATE OF CORRECTION

| | |
|---|---|
| PATENT NO. | : 11,315,555 B2 |
| APPLICATION NO. | : 16/204823 |
| DATED | : April 26, 2022 |
| INVENTOR(S) | : Hong Su, Peng Li and Lifeng Zhao |

It is certified that error appears in the above-identified patent and that said Letters Patent is hereby corrected as shown below:

In the Claims

At Column 9, Lines 21-22 (Claim 1, Lines 8-9), please delete "analyzing the v01ce, determining whether the v01ce" insert --analyzing the voice, determining whether the voice-- therefor.

Signed and Sealed this
Thirteenth Day of December, 2022

Katherine Kelly Vidal
*Director of the United States Patent and Trademark Office*